US012682001B2

(12) United States Patent
Prasad et al.

(10) Patent No.: US 12,682,001 B2
(45) Date of Patent: Jul. 14, 2026

(54) COMPUTER-BASED DOMAIN NAME RECOMMENDATION SYSTEM UTILIZING PERSONALIZED GENERATIVE ARTIFICIAL INTELLIGENCE ENGINES AND METHODS OF USE THEREOF

(71) Applicant: Go Daddy Operating Company, LLC, Tempe, AZ (US)

(72) Inventors: Ankush H. Prasad, Santa Clara, CA (US); Wenbo Wang, Santa Clara, CA (US); Vinit Badrike, Santa Clara, CA (US); Chungwei Yen, Santa Clara, CA (US); Larry Lai, Santa Clara, CA (US)

(73) Assignee: Go Daddy Operating Company, LLC, Tempe, AZ (US)

( * ) Notice: Subject to any disclaimer, the term of this patent is extended or adjusted under 35 U.S.C. 154(b) by 18 days.

(21) Appl. No.: 18/952,454

(22) Filed: Nov. 19, 2024

(65) Prior Publication Data

US 2026/0141009 A1      May 21, 2026

(51) Int. Cl.
*G06F 16/9535* (2019.01)
*G06F 40/284* (2020.01)

(52) U.S. Cl.
CPC ........ *G06F 16/9535* (2019.01); *G06F 40/284* (2020.01)

(58) Field of Classification Search
CPC .......... G06F 16/23; G06F 16/33; G06F 9/466; G06F 21/6245; H04L 67/02
USPC ........................................................ 707/790
See application file for complete search history.

(56) References Cited

U.S. PATENT DOCUMENTS

| | | | | |
|---|---|---|---|---|
| 9,990,432 | B1 * | 6/2018 | Lai ...................... | G06F 16/9535 |
| 10,778,640 | B1 * | 9/2020 | Cholleton .............. | G06F 16/35 |
| 10,904,212 | B1 * | 1/2021 | Kaizer ................... | H04L 51/52 |
| 10,959,090 | B1 * | 3/2021 | Paiz ....................... | H04L 63/04 |
| 11,294,974 | B1 * | 4/2022 | Shukla ............. | G06F 16/90335 |
| 11,960,550 | B1 * | 4/2024 | Faust ................... | G06F 16/951 |
| 12,211,620 | B2 * | 1/2025 | Devore .................. | G06N 7/01 |
| 2011/0252021 | A1 * | 10/2011 | Clark .................. | G06F 16/9535 707/E17.011 |
| 2015/0227598 | A1 * | 8/2015 | Hahn ..................... | G06F 16/11 707/737 |

(Continued)

*Primary Examiner* — Amy Ng
*Assistant Examiner* — Abdullah A Daud
(74) *Attorney, Agent, or Firm* — CHIP LAW GROUP

(57) ABSTRACT

A method includes receiving a domain search query from a first user, generating a prompt based on the query to instruct a first model to provide a domain recommendation, where the first model is trained by utilizing a dataset including: first data reflecting interactions of users with domain portfolios, second data reflecting domain-related actions performed by the users, third data reflecting behaviors of a second user during a current domain search session, fourth data reflecting behaviors of the second user over a predetermined period covering multiple search sessions, and fifth data reflecting search scenarios of multiple users, determining the domain recommendation against a predetermined rule to form a sanitized domain recommendation, verifying an availability to register the sanitized domain recommendation to form an available domain recommendation, adding industry information to the available domain recommendation to form an enriched domain recommendation, and transmitting the enriched domain recommendation to the first user.

17 Claims, 8 Drawing Sheets

(56)  References Cited

U.S. PATENT DOCUMENTS

| | | | |
|---|---|---|---|
| 2016/0239899 A1* | 8/2016 | Kamdar | G06Q 30/0629 |
| 2018/0211320 A1* | 7/2018 | Kamdar | G06Q 40/06 |
| 2020/0133967 A1* | 4/2020 | Shukla | G06F 16/3334 |
| 2021/0097168 A1* | 4/2021 | Patel | G06F 21/554 |
| 2023/0282350 A1* | 9/2023 | Devore | G16H 40/67 |
| 2023/0334070 A1* | 10/2023 | Gullapudi | G06F 16/90344 |
| 2024/0202530 A1* | 6/2024 | Meng | G06N 3/084 |
| 2025/0094774 A1* | 3/2025 | Zhang | G06N 3/0475 |

* cited by examiner

From/to Generative AI Unit (150)

180

Vector-Based Recommender 402

Instrumentation Log 270

Real-Time Information and prompt System 410

Tokenizer 490

LLM-Based Predictor 230

Embedding Model 495

Guardrail Unit 240

Availability Checking Unit 250

Industry ML-Based Predictor 260

Availability Checking Unit 450

Vector Compute Plane 470

Vector Store 480

270

470

700

Data Source

Real Time Signal
System
210

Domain Search Mart
716

710

Base Model
730

Training Dataset
Generator
720

Estimator
740

Fine-tuned Model
750

Inference

Endpoint
762

Predictor
765

760

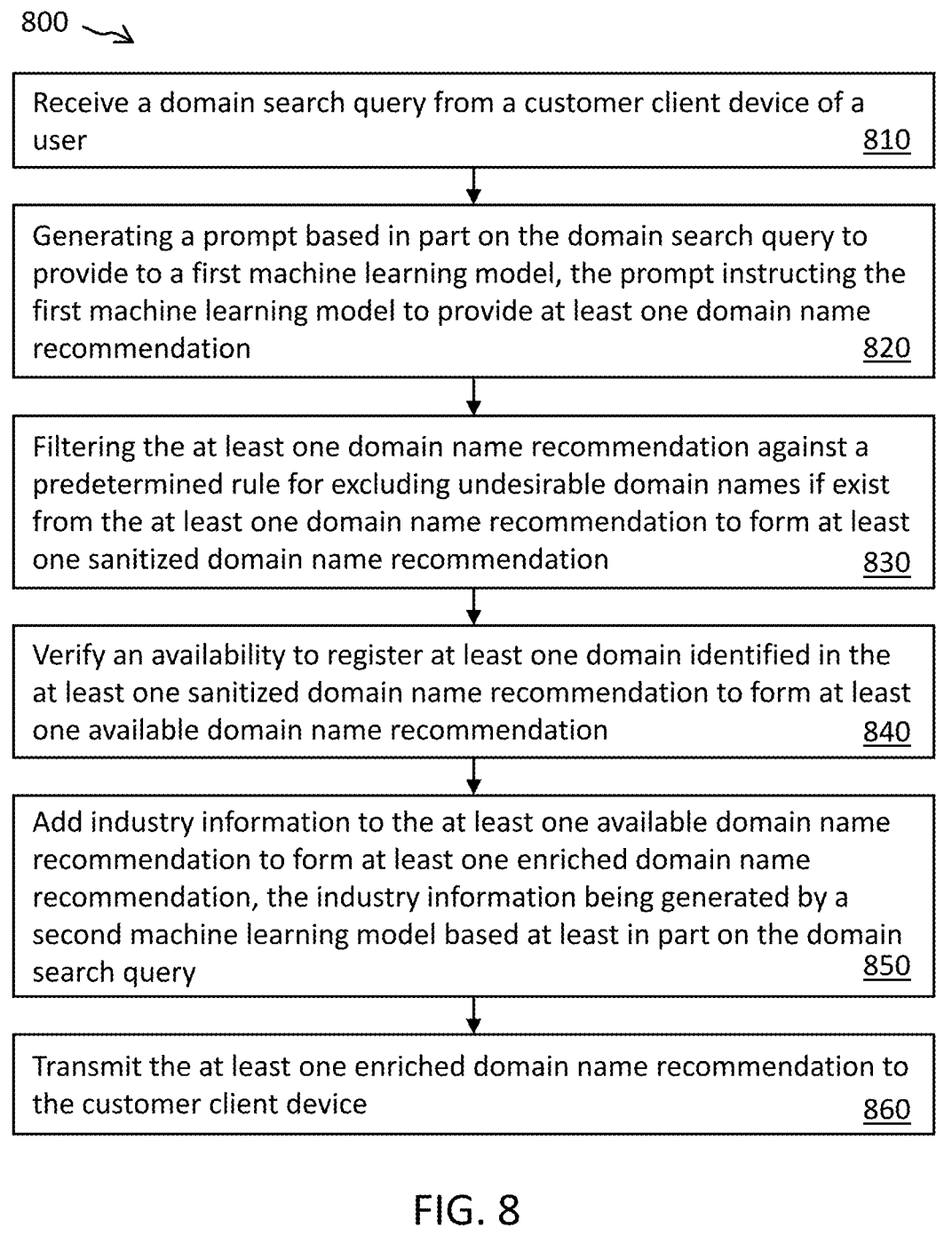

800 ⤵

| |
|---|
| Receive a domain search query from a customer client device of a user                                                                    810 |

↓

| |
|---|
| Generating a prompt based in part on the domain search query to provide to a first machine learning model, the prompt instructing the first machine learning model to provide at least one domain name recommendation                                                           820 |

↓

| |
|---|
| Filtering the at least one domain name recommendation against a predetermined rule for excluding undesirable domain names if exist from the at least one domain name recommendation to form at least one sanitized domain name recommendation                         830 |

↓

| |
|---|
| Verify an availability to register at least one domain identified in the at least one sanitized domain name recommendation to form at least one available domain name recommendation                                          840 |

↓

| |
|---|
| Add industry information to the at least one available domain name recommendation to form at least one enriched domain name recommendation, the industry information being generated by a second machine learning model based at least in part on the domain search query                                                                        850 |

↓

| |
|---|
| Transmit the at least one enriched domain name recommendation to the customer client device                                                     860 |

FIG. 8

COMPUTER-BASED DOMAIN NAME RECOMMENDATION SYSTEM UTILIZING PERSONALIZED GENERATIVE ARTIFICIAL INTELLIGENCE ENGINES AND METHODS OF USE THEREOF

FIELD OF TECHNOLOGY

The present disclosure generally relates to the field of internet domain name management, and, more particularly, to computer-based domain name recommendation using personalized generative artificial intelligence.

BACKGROUND OF TECHNOLOGY

Typically, a domain name is a unique identifier for a website on the internet. Typically, domain name may serve as the address that users type into their web browsers to access a corresponding website. A domain name typically consists of two main parts: second-level domain (SLD) and top-level domain (TLD). SLD is a main part of the domain name, such as "example" in "example.com". TLD is an extension that follows the SLD, such as .com, .org, and .net, etc.

Typically, domain names may be used to identify and locate computers on the internet in a way that is easier to remember than numerical IP addresses. The Domain Name System (DNS) translates domain names into IP addresses, allowing browsers to load the correct website. Domain names are registered through domain registrars, and they need to be renewed periodically to remain active.

Typically, domain search may involve a process of finding information about domain names. A domain name search can include checking the availability of a domain name, retrieving details about the domain's registration, and gathering data on the domain's history and ownership. Domain name search personalization may typically involve obtaining such information as user preferences, geographic location, search history, behavior data, device and context.

SUMMARY OF DESCRIBED SUBJECT MATTER

In some aspects, the techniques described herein relate to a method, including: receiving, by a computing device, a domain search query from a customer client device of a first user; generating, by the computing device, a prompt based in part on the domain search query to provide to a first machine learning model, the prompt instructing the first machine learning model to provide at least one domain name recommendation, where the first machine learning model is trained by utilizing at least one dataset including: first data reflecting interactions of a plurality of users with a plurality of domain portfolios; second data reflecting a plurality of domain-related actions performed by the plurality of users, including at least one first domain-related action with at least one top-level domain (TLD) and at least one second domain-related action with at least one second-level domain (SLD); third data reflecting a behavior of a second user during a current domain search session; fourth data reflecting a plurality of behaviors of the second user over a predetermined period of time covering a plurality of search sessions of the second user; and fifth data reflecting a plurality of search scenarios of the plurality of users; determining, by the computing device, the at least one domain name recommendation against at least one predetermined rule to form at least one sanitized domain name recommendation; verifying, by the computing device, an availability to register at least one domain identified in the at least one sanitized domain name recommendation to form at least one available domain name recommendation; adding, by the computing device, industry information to the at least one available domain name recommendation to form at least one enriched domain name recommendation, the industry information being generated by a second machine learning model based at least in part on the at least one available domain name recommendation; and transmitting, by the computing device, at least one computer instruction configured for the customer client device to present the at least one enriched domain name recommendation to the first user in association with an action-enable graphical user element.

In some aspects, the techniques described herein relate to a method, where the prompt is generated based at least in part on at least one customer signal associated with the domain search query.

In some aspects, the techniques described herein relate to a method, where the at least one customer signal is obtained through at least one cookie stored in the customer client device.

In some aspects, the techniques described herein relate to a method, where the domain search query includes an identification of the customer client device.

In some aspects, the techniques described herein relate to a method, where the prompt is generated based at least in part on at least one user profile information.

In some aspects, the techniques described herein relate to a method, where the at least one user profile information is retrieved with the identification of the customer client device.

In some aspects, the techniques described herein relate to a method, where the user profile information includes aggregated patterns of search behavior, purchase histories and preferences of the first user.

In some aspects, the techniques described herein relate to a method, where the prompt includes at least one of: at least one prompt payload, at least one temperature hyperparameter and at least one diversity parameter.

In some aspects, the techniques described herein relate to a method, where the predetermined rule includes a list of undesirable items for a domain name, the undesirable items including at least one of: at least one taboo token, at least one exclusion word and at least one unsellable TLD.

In some aspects, the techniques described herein relate to a method, where the second machine learning model is trained by industry data collected by at least one online service provider.

In some aspects, the techniques described herein relate to a method, where the industry information includes information on ways of utilizing the at least one sanitized domain name recommendation by at least one industry pertaining to the sanitized domain name recommendation.

In some aspects, the techniques described herein relate to a method, further including streaming, by the computing device, at least the enriched domain name recommendation into at least one log group.

In some aspects, the techniques described herein relate to a method, further including transforming the at least one log group from a first format to a second format.

In some aspects, the techniques described herein relate to a method, further including: tokenizing, by the computing device, the domain search query; generating, by the computing device, a first plurality of vector embeddings from the tokenized domain search query; tokenizing, by the computing device, the available domain name recommendation;

generating, by the computing device, a second plurality of vector embeddings from the tokenized available domain name recommendation; and performing, by the computing device, vector space search on the first and second plurality of vector embeddings.

In some aspects, the techniques described herein relate to a method, further including augmenting the at least one enriched domain name recommendation with at least one keyword-based domain name suggestion to form at least one augmented domain name recommendation replacing the enriched domain name recommendation to be transmitted to the customer client device.

In some aspects, the techniques described herein relate to a method, further including a public endpoint for receiving the domain search query and for providing the enriched domain name recommendation to the customer client device.

In some aspects, the techniques described herein relate to a system, including: at least one processor; and at least one memory storing a plurality of computing instructions configured to instruct the at least one processor to: receive a domain search query from a customer client device of a first user; generate a prompt based in part on the domain search query to provide to a first machine learning model, the prompt instructing the first machine learning model to provide at least one domain name recommendation, where the first machine learning model is trained by utilizing at least one dataset including: first data reflecting interactions of a plurality of users with a plurality of domain portfolios; second data reflecting a plurality of domain-related actions performed by the plurality of users, including at least one first domain-related action with at least one top-level domain (TLD) and at least one second domain-related action with at least one second-level domain (SLD); third data reflecting a behavior of a second user during a current domain search session; fourth data reflecting a plurality of behaviors of the second user over a predetermined period of time covering a plurality of search sessions of the second user; and fifth data reflecting a plurality of search scenarios of the plurality of users; determine the at least one domain name recommendation against a predetermined rule to form at least one sanitized domain name recommendation; verify an availability to register at least one domain identified in the at least one sanitized domain name recommendation to form at least one available domain name recommendation; add industry information to the at least one available domain name recommendation to form at least one enriched domain name recommendation, the industry information being generated by a second machine learning model based at least in part on the at least one available domain name recommendation; and transmit at least one computer instruction configured for the customer client device to present the at least one enriched domain name recommendation to the first user in association with an action-enable graphical user element.

In some aspects, the techniques described herein relate to a system, where the prompt is generated based at least in part on at least one customer signal associated with the domain search query.

In some aspects, the techniques described herein relate to a system, where the prompt is generated based at least in part on at least one user profile information retrieved with an identification contained in the domain search query.

In some aspects, the techniques described herein relate to a system, where the second machine learning model is trained by industry data collected by at least one online service provider.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 8 is a flowchart illustrating an exemplary process for generating domain name recommendation in accordance with one or more embodiments of the present disclosure.

DETAILED DESCRIPTION

Figure 1:
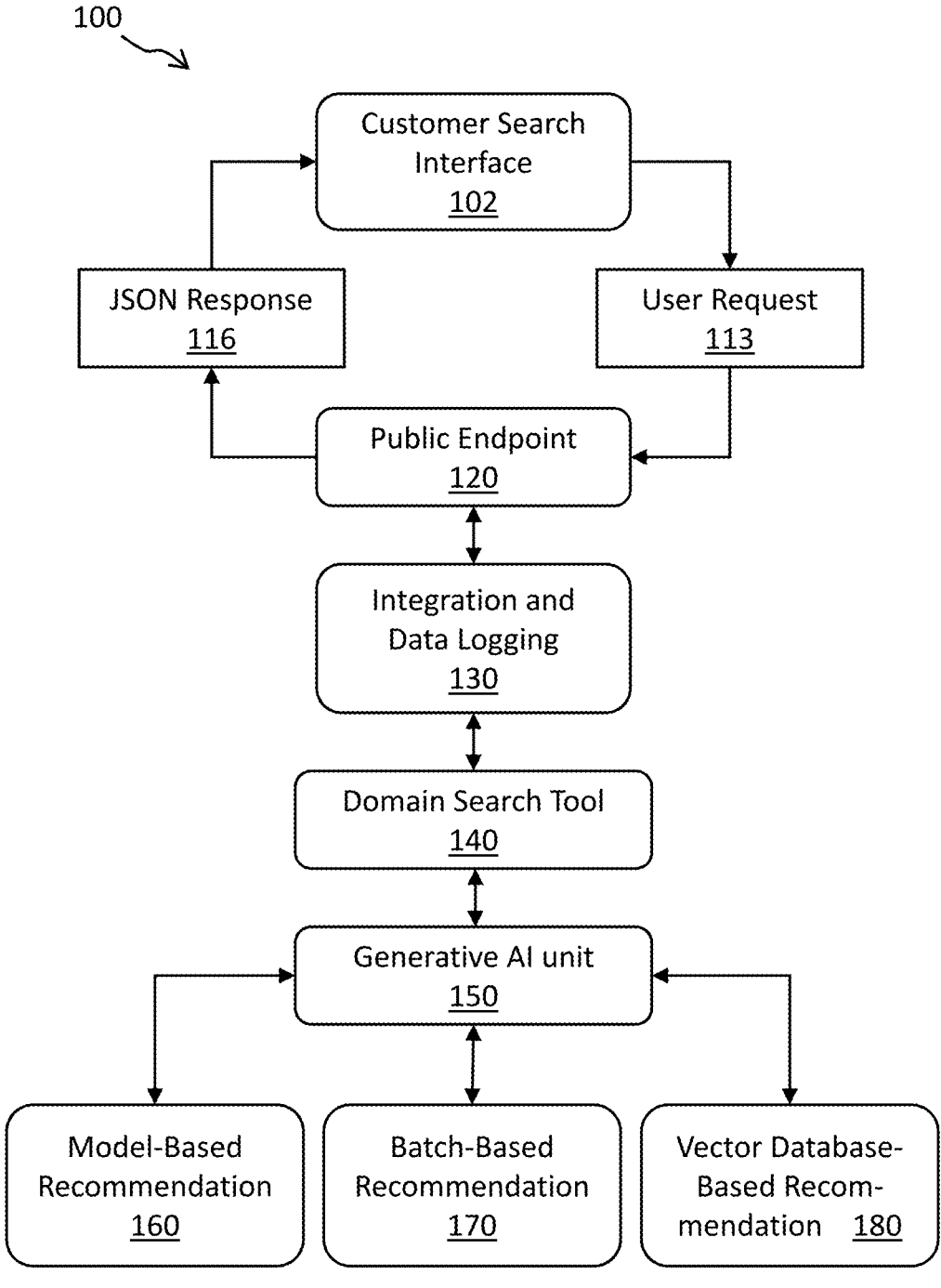
FIG. 1 is a block diagram illustrating an architecture of an exemplary domain name recommendation system in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in at least some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure relates to a domain name recommendation system utilizing personalized generative artificial intelligence (AI) engine and accompanying method of use thereof. The domain name recommendation system and accompanying method fine-tune open-source large language models (LLMs) with proprietary data to generate domain name suggestions that are not only personalized but also highly relevant and diverse. A crucial aspect of the fine-tuning process is the preparation of a targeted dataset that can guide the model to learn domain-specific nuances. The data ingested into the model includes structured queries that reflect various customer interactions and preferences related to domain names. The dataset includes detailed prompts that simulate real customer scenarios, thereby training the LLM to predict domain that align with customer preferences and search history. The fine-tuning leverages multiple data tables that encompass a broad spectrum of customer interactions: with different domain portfolios; details from searches, purchases, including TLDs and Slides actioned by the customers; and session and historical data providing a deeper context for current searches.

Once fine-tuning is complete, the LLM is deployed to provide real-time, scalable, and efficient domain name recommendations directly to customers.

Domain name recommendation may have some unique challenges. For example, inventory of domain names may be unique, i.e., each domain may be unique and once registered, may no longer be available. Such unique inventory necessitates timely and pertinent domain name suggestions. Demand for domain names may also be imbalanced. Popular TLDs, such as .COM, have a high demand, making it challenging to find desirable, available domain names. Further, the preferences of customers may be diverse across different regions and industries. To recommend domain names for such complex needs may require a personalized approach.

In order to dynamically update and tailor domain name recommendations, the generative AI recommendation system may utilize real-time customer signals, such as intent and interaction patterns to enhance the AI prediction. The real-time customer signals allow the generative AI recommendation system to adapt its recommendations based on real-time interactions, providing more relevant and engaging suggestions. By processing both positive and negative customer signals swiftly, the generative AI recommendation system may shorten the feedback loop from days to seconds, enhancing the relevance of suggestions within a same domain search session. Real-time signals may also ensure that the generative AI recommendations remain relevant, adjusting to the transient nature of customer preferences. For search session conducted by guest users, the generative AI recommendation system may utilize available real-time customer signals to personalize suggestions, ensuring effectiveness even with limited user data.

In at least some embodiments, the generative AI recommendation system fine tunes a foundational model to serve highly personalized domain recommendations. The fine-tuning process may involve an elaborate process of adapting the model to understand and generate domain name suggestions based on intricate proprietary customer data. The proprietary customer data may be organized into multiple specialized data tables that may be used to generate the structured dataset for training the foundational model to enable the model to generate highly personalized domain name recommendations.

A crucial aspect of the fine-tuning process may be the preparation of a targeted dataset that can guide the foundational model to learn domain-specific nuances. The data ingested into the foundational model may include structured queries that reflect various customer interactions and preferences related to domain names. In some embodiments, the proprietary customer data may be stored in a cloud storage in a format that supports efficient querying and retrieval. An example of the SQL used to create and populate the training dataset may be:

```
CREATE TABLE <table> WITH (
    format='JSON',
    bucketed_by=ARRAY ['instruction'],
    bucket_count=1,
    write_compression='NONE',
    external_location='xxx://<location>'
) AS
SELECT 'Given the customer current search queries,
    previous search queries, actioned TLDs (either added
    to cart or purchased), actioned SLDs (SLD portion of
    domain names), generate domain names, prioritizing
    their historical preferences for certain TLDs and SLDs,
    suggest domain names that they would find relevant
    and appealing enough to purchase.' as instruction,
. . .
FROM <final table>
```

The above dataset may include detailed prompts that simulate real customer scenarios, thereby training the foundational model to predict domain names that align with customer preferences and search history.

In at least some embodiments, the fine-tuning process may leverage multiple data tables that encompass a broad spectrum of customer interactions such as portfolio metrics, customer search data, and session and historical data. The portfolio metrics refers to data concerning customer interactions with different domain portfolios. The customer search data refers to details from searches, purchases, including TLDs and SLDs actioned by the customers. The session and historical data may refer to insights into customer behavior over time and during specific sessions, providing a deeper context for current searches.

In at least some embodiments, the fine-tuning technique may involve customizing the foundational mode with a dataset specifically designed to mirror the complex decision-making process of domain name selection. This process ensures that a trained model can generate relevant, appealing domain names based on a rich context that may include current and historical search queries, preference weights for TLDs and SLDs and real-time customer signals. The current and historical search queries enable the domain recommendation system to understand the evolution of customer interests over time. The preference weights for TLDs and SLDs enable prioritizing suggestions based on historically preferred domains. The real-time customer signals incorporate dynamic inputs from current interactions to tailor suggestions instantly.

The term "customer signal", as used herein generally refers to real-time data points (intent, preference and pattern, etc.) gathered during an active search session. The customer signals capture the immediate actions and intent of the user, such as ongoing searches or preferences in that specific session.

In at least some embodiments, the generative AI domain recommendation system may leverage customer-specific data, such as favored TLDs, frequently searched keywords, and recent search behaviors in such ways as improved personalization and relevance, enhanced diversity of suggestions and adaptive suggestions. The improved personalization and relevance may be achieved by analyzing customer-specific data to generate domain name recommendations that may be more closely aligned with the individual user's preferences, and making the recommendations more relevant to their specific needs and context. The customer-specific data may include data on preferred TLDs, keywords frequently searched by the user, and their recent search patterns. The enhanced diversity of suggestions may refer to offering a diverse range of domain name options by considering the customer's favored TLDs and keyword patterns. The diverse range of domain name options may include industry-specific terms and various TLDs (.com, .net and .org, etc.), thus may increase the likelihood of finding an appealing and available domain name. By analyzing customer data and the relevant industry, the system can incorporate terms that are more aligned with the customer's niche or market. For example, a customer in the tech industry may receive domain suggestions featuring technology-related keywords, while someone in real estate may receive domain suggestions featuring realty-specific terms. For customers with limited domain name search historical data, the generative AI domain name recommendation system adapts by analyzing real-time market trends to provide relevant domain recommendations, ensuring that even new users receive high-quality and contextually appropriate domain name suggestions.

In at least some embodiments, a cloud-based machine learning (ML) hub may be utilized to simplify the process of fine-tuning LLMs by providing a structured environment where models can be trained on specific datasets. The use of the cloud-base ML hub may facilitates the management of computational resources, model training, and deployment, ensuring that the fine-tuning process is both efficient and scalable.

In at least some embodiments, the model fine-tuning process may involves setting up a training environment and specifying hyper parameters that control the learning process. The hyper parameters may include a learning rate, epochs and batch size and low-rank adaptation (LoRA). The learning rate is a crucial hyper parameter in fine-tuning neural networks. A lower learning rate ensures that the model gradually adjusts to the nuances of the new data, preventing overfitting and allowing for more stable convergence. The number of epochs and the batch size dictate how many times the model will see the entire dataset and how many samples per batch to work through before updating the internal model parameters. The LoRA may be an optimization technique involving modifying a smaller subset of the model's parameters, significantly reducing memory requirements and computational overhead.

FIG. 1 is a block diagram illustrating a structure of an exemplary domain name recommendation system 100 in accordance with one or more embodiments of the present disclosure. The system 100 may exemplarily include a customer search interface 102, a user request unit 113, a JavaScript Object Notation (JSON) response unit 116, a public endpoint 120, an integration and data logging unit 130, a domain search tool 140, a generative AI unit 150 in communication with a model-base recommendation unit 160, a batch-based recommendation unit 170 and a vector database-based recommendation unit 180.

In at least some embodiments, the customer search interface 102 may be present in a customer client device, such as an internet connect computer or a mobile device of a user, and designed to help users find specific domain information quickly and efficiently. The customer search interface 102 may receive computer instructions from the JSON response unit 116. The computer instructions may be configured for the customer search interface to present domain name recommendations to the user in association with an action-enable graphical user element. As an example, the action-enable graphical user element may be a selection box for the user to select the associated domain name recommendation. The customer search interface 102 may exemplarily include a search bar and a search results display. The search bar is a primary element where a user inputs search queries. The input may be text entered on a keyboard. Alternatively, the input may include voice commands converted into text. In some embodiments, the search bar may utilize autocomplete and suggestions as the user types. The search results display presents the search results, such as available domain names, to the user in a clear and organized manner. In some embodiments, the customer search interface 102 is implemented in a mobile device in communication with a server of a domain registration provider over the internet.

In at least some embodiments, the user request unit 113 may collect customer behavior data using three key identifiers: visitor_guid, visit_guid and data points. The visitor_guid may refer to a 1-year cookie stored on the customer's browser, used to track long-term behavior and preferences. The visit_guid may refer to a session cookie identifier exemplarily valid for 20 minutes, capturing customer activity within a single session. The data points may refer to detailed search data such as total searches, TLDs and SLDs searched, domain availability, and various pricing information (list, current, renewal prices). The above data collection may be done through real-time application programming interface (API) calls.

In at least some embodiments, the JSON response unit 116 translates domain search results into JSON format, for example, "domains": [{"fqdn": "spizza123.com"}, {fqdn": "zoespizza123.ai"}]. The term, JSON, as used herein generally refers to a lightweight data-interchange format that is easy for humans to read and write, and easy for machines to parse and generate.

In at least some embodiments, the public endpoint 120 may be specific uniform resource locator (URL) where a web service or API can be accessed by the public. Such access may include the user sending requests and the server responding with the requested data or action. The public endpoint 120 may be exposed to the public, so that the rest endpoints may be better protected.

The term, "endpoint", as used herein generally refers to a specific uniform resource locator (URL) where an application programming interface receives (API) requests and sends responses. An endpoint can be viewed as a digital address where a particular resource or service is located on a server. Endpoints are crucial because they define where and how clients (like web browsers or mobile apps) can access the resources they need. For example, a weather app may send a request to an endpoint like https://api.weather-.com/v1/current to get the current weather data. Endpoints are typically part of a larger API, which is a set of rules that allows different software applications to communicate with each other. Each endpoint corresponds to a specific function or resource within the API, such as retrieving user data, posting a comment, or updating a profile.

As shown in FIG. 1, a customer search query may be received by the customer search interface 102, transmitted to the public endpoint 120 via the user request unit 113. On the other hand, a domain search result may be transmitted from the public endpoint 120 to the customer search interface 102 via the JSON response unit 116.

In at least some embodiments, the integration and data logging unit 130, connected between the public endpoint 120 and the domain search tool 140, may be an internal endpoint that attaches user profile to a request, and generates final search results by inserting at least one advertised domain into search results. The integration and data logging unit 130 also perform data logging for record keeping purpose and instrumentation. The term, "instrumentation", as used herein generally refers to a process of adding code to an application to collect data about its performance, behavior, and resource usage. The instrumentation is typically done to monitor and analyze how an application is functioning, identifying performance bottlenecks, and diagnose issues.

In at least some embodiments, the domain search tool 140 may be a domain analytics and WHOIS research tool, providing detailed information about domain names, registrants, nameservers, and IP addresses. The WHOIS is a query and response protocol used to look up information about the registered users or assignees of an internet resource, such as domain names, IP address blocks, and autonomous systems. WHOIS essentially acts like a directory, providing details about who owns a domain name and how to contact them. The WHOIS database is maintained by the Internet Corporation for Assigned Names and Numbers (ICANN). The domain search tool 140 also offers a variety of tools, including live and historical domain ownership records, website snapshots, ISP and DNS historical hosting records, and reverse lookup tools in addition to keyword-based domain name suggestions. In an example, the domain search tool 140 may be implemented with DomainIQ™.

In at least some embodiments, the generative AI unit 150 may generate LLM-based domain name suggestions and augment the keyword-based domain name suggestions by the domain search tool 140.

The generative AI may include such components as foundation model, training data, training process, tuning, generation mechanism and evaluation and returning. The foundation model may be a deep learning model, such as the large language models (LLMs), trained on vast amounts of data. The generative AI models are trained on extensive datasets, which can include text from books, articles, images, videos and more. The quality and diversity of this data are crucial for the model's performance. The model undergoes a training phase where it learns to predict the next element in a sequence by minimizing the difference between its predictions and the actual data. After the initial training, the model can be fine-tuned for specific applications or tasks, improving its accuracy and relevance for particular use cases. The generative mechanism is a part of the model that generates new content based on the patterns and relationships the model has learned during training. The model can create content, such as text, in response to user prompts.

The generated content is evaluated for quality and accuracy, and the model may be continually adjusted to improve its outputs.

In at least some embodiments, the generative AI unit 150 may be a constellation of internal endpoints in response to customer domain search queries for obtaining AI generated domain name recommendations, via APIs, from various endpoints such as the model-base recommendation unit 160, the batch-based recommendation unit 170 and/or the vector database-based recommendation unit 180 as described herein below in association with FIGS. 2-4. These APIs form a comprehensive suite that leverages advanced machine learning techniques to deliver highly personalized domain name recommendations. Each endpoint is crafted to meet specific customer needs, from trending domain insights to real-time personalized recommendations, ensuring that every customer interaction is optimized for engagement and satisfaction.

Figure 2:
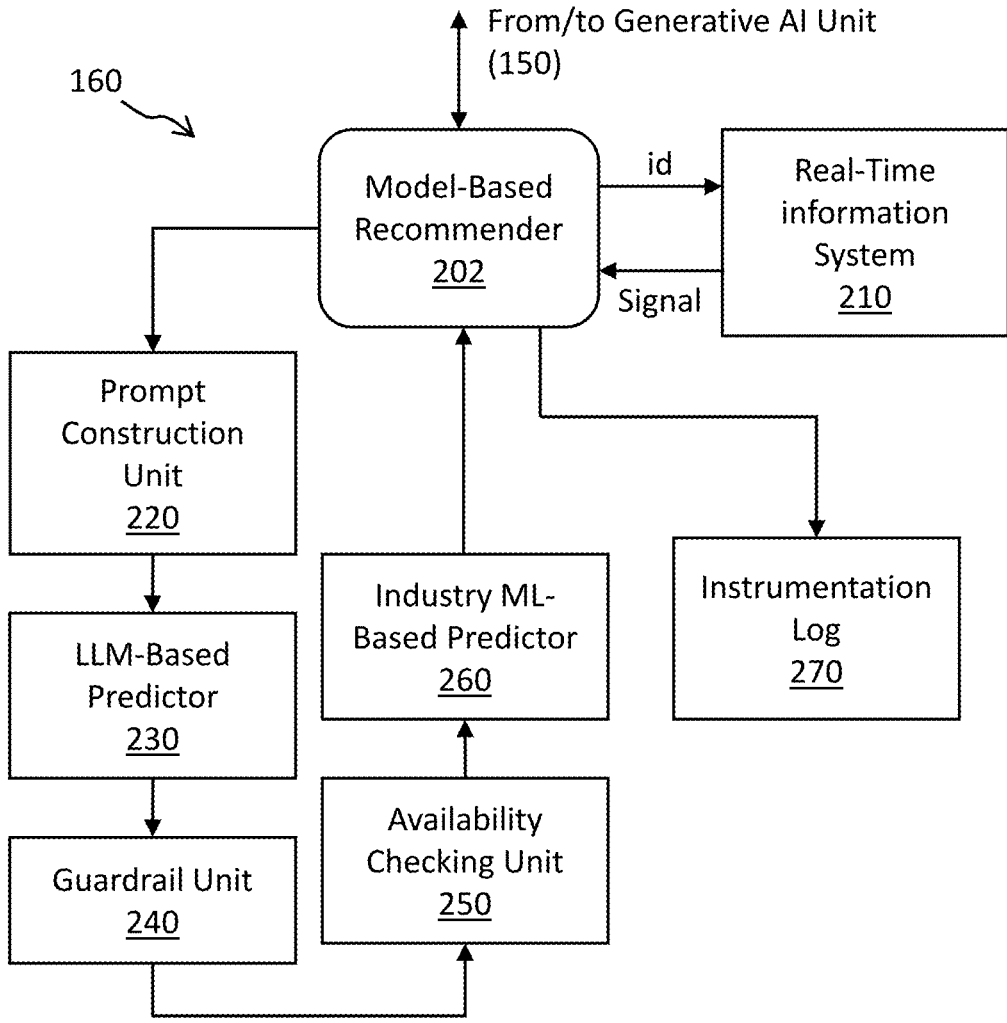
FIG. 2 is a block diagram illustrating a structure of an exemplary model-based recommendation unit in the exemplary domain name recommendation system shown in FIG. 1.

FIG. 2 is a block diagram illustrating a structure of an exemplary model-based recommendation unit 160 in the exemplary domain name recommendation system 100 shown in FIG. 1. The model-based recommendation unit 160 may generate domain name recommendations based on previously trained LLM models in response to customer queries. The model-based recommendation unit 160 may include a model-based recommender 202 receiving user query information from the generative AI unit 150 via APIs. The user query information may include a user identification which is used to retrieve customer signal and user profile from a real-time information system 210. The term, "user profile", as used herein generally refers to comprehensive, long-term collections of customer data built from multiple interactions over time. The user profile may include aggregated patterns of search behavior, purchase history, and user preferences. The user profile may be used to understand and predict future behavior, allowing for highly personalized domain suggestions. The user profile may continuously evolve with each search session, providing a holistic view of the customer.

While the user profile may represent a long-term, aggregated view of customer behavior, offering deep insights for future recommendations, customer signals may be real-time reflections of immediate actions, allowing the real-time information system 210 to response dynamically during an ongoing search session. Together, the user profile and the customer signal work in tandem, with the real-time customer signals updating the user profiles to keep the user profiles relevant and adaptive.

In at least some embodiments, customer signals, user profiles, and context information work together to deliver real-time personalized domain suggestions. For example, customer signals may be collected from user behaviors, such as searches, domain preferences, and interaction patterns. These customer signals may be processed instantly to ensure recommendations align with live behavior. User profiles may combine historical data (e.g., up to 3 months) and recent activity (e.g., past 7 days and the current session). These user profiles may be continuously updated to reflect evolving customer preferences and behaviors. Context information allows the system to understand patterns within searches, such as repeated queries for similar Second-Level Domains (SLDs) across multiple Top-Level Domains (TLDs). The context information may enable the system to recommend relevant options based on session continuity and broader market trends.

In at least some embodiments, the customer signals, user profiles, and context data may be used both for training a machine learning (ML) model and inferencing therewith. Initially, the ML model may be trained on historical customer data (searches, purchases, and interactions). During real-time sessions, the trained ML model may use these inputs (customer signals, user profiles, and context data) to predict and suggest the most relevant domains. The ML model may be retrained periodically with fresh data to keep pace with changing behaviors and trends, ensuring that domain suggestions remain accurate and personalized.

Referring again to FIG. 2, the model-based recommender 202 may pass the customer signal and the user profile to a prompt construction unit 220 for generating prompt payload, temperature, top_p tokens. The prompt payload refers to the input provided to the AI model to guide its response. In the context of AI models, temperature may be a hyperparameter that controls the randomness and creativity of the model's output. The temperature essentially determines how predictable or varied the responses will be. When the temperature is low (closer to 0), the model produces more predictable and conservative outputs. This means that the model will choose the most likely next word or token resulting in response that are more deterministic and focused. When the temperature is high (closer to 1), the model generates more diverse and creative responses. It allows for more randomness, which can lead to unexpected or less conventional outputs. The top_p token may refer to a parameter used to control the diversity of the generated text by an AI model. The top_p parameter works by considering only the smallest set of tokens whose cumulative probability exceeds a certain threshold (p). For example, when top_p=0.1, the model will consider only the tokens that make up the top 10% of the probability mass. This means it will be very selective, leading to more focused and deterministic outputs. When top_p=0.9, the model will consider tokens that make up the top 90% of the probability mass. This allows for more diversity and creativity in the output. By adjusting the top_p value, the system can balance between generating more predictable responses and allowing for more varied and creative outputs.

Referring again to FIG. 2, outputs from the prompt construction unit 220 may be provided to an LLM-based predictor 230 which includes a trained AI model for generating domain name recommendations. Outputs from the LLM-base predictor 230 in the form of domain recommendation strings may be passed to a guardrail unit 240 for sanitization. The guardrail unit 240 may filter or sanitize the domain name recommendations generated by the LLM-based predictor 230 against a predetermined rule in a sanitization process. In some embodiments, the predetermined rule may include a list of undesirable items for a domain name, such as taboo tokens, exclusion words and/or unsellable TLDs. The guardrail unit 240 generates sanitized domain name recommendations to be sent to an availability checking unit 250. The availability checking unit 250 checks the sanitized domain name recommendations against an incremental zone, registry zone and/or aftermarket listing to generate available domain name recommendation. The incremental zone allows updating zone information more efficiently by only transferring the changes made since the last update. The registry zone refers to a TLD registry that manages and maintains the database of domain names under a specific TLD. Each TLD, like .com, .org, or country-code TLDs such as .uk or .jp, has a registry that is responsible for the technical operations of the domain, including the DNS settings and the availability of domain names for registration. The registry zone includes all the domain names registered under a particular TLD and their corresponding DNS records. The registry itself does not sell domain names directly to the public; instead, it works with registrars which are companies authorized to sell domain names to individuals or organizations. The aftermarket listing refers to for-sale offerings on aftermarket platforms for domain names previously registered but no longer needed or not renewed by the owner.

Referring again to FIG. 2, the available domain name recommendations generated by the availability checking unit 250 may be provided to an industry ML-based predictor 260. The ML-based predictor 260 may include at least one ML model trained by proprietary industry data collected by online service (including domain name registration) providers. The ML model may be a deep learning model trained using SLD of a domain name and the industry mapping. The industry mapping in the context of domain names involves analyzing and understanding how different industries utilize domain names and the trends and patterns associated with their online presence.

As shown in FIG. 2, the industry ML-based predictor 260 may add industry information for each of the recommended domain names, and then output the enriched domain name recommendation to the model-based recommender 202 for being accessed by the generative AI unit 150 via an API. The industry information may include information on ways of utilizing the recommended domain names by an industry that may pertain to the recommended domain names.

Referring again to FIG. 2, the model-based recommendation unit 160 may further include an instrumentation log unit 270. An instrumentation log is a record of data generated by the domain name recommendation system 100 that have been instrumented for monitoring and analysis. Instrumentation involves adding code or using tools to collect performance metrics, operational data, and other relevant information from a system, allowing developers, operators, or analysts to understand how the system behaves in real time. In some embodiments, at least the enriched domain name recommendation may be stored in the instrumentation log unit 270. An exemplary structure of the instrumentation log unit 270 is described herein below in association with FIG. 5.

Figure 3:
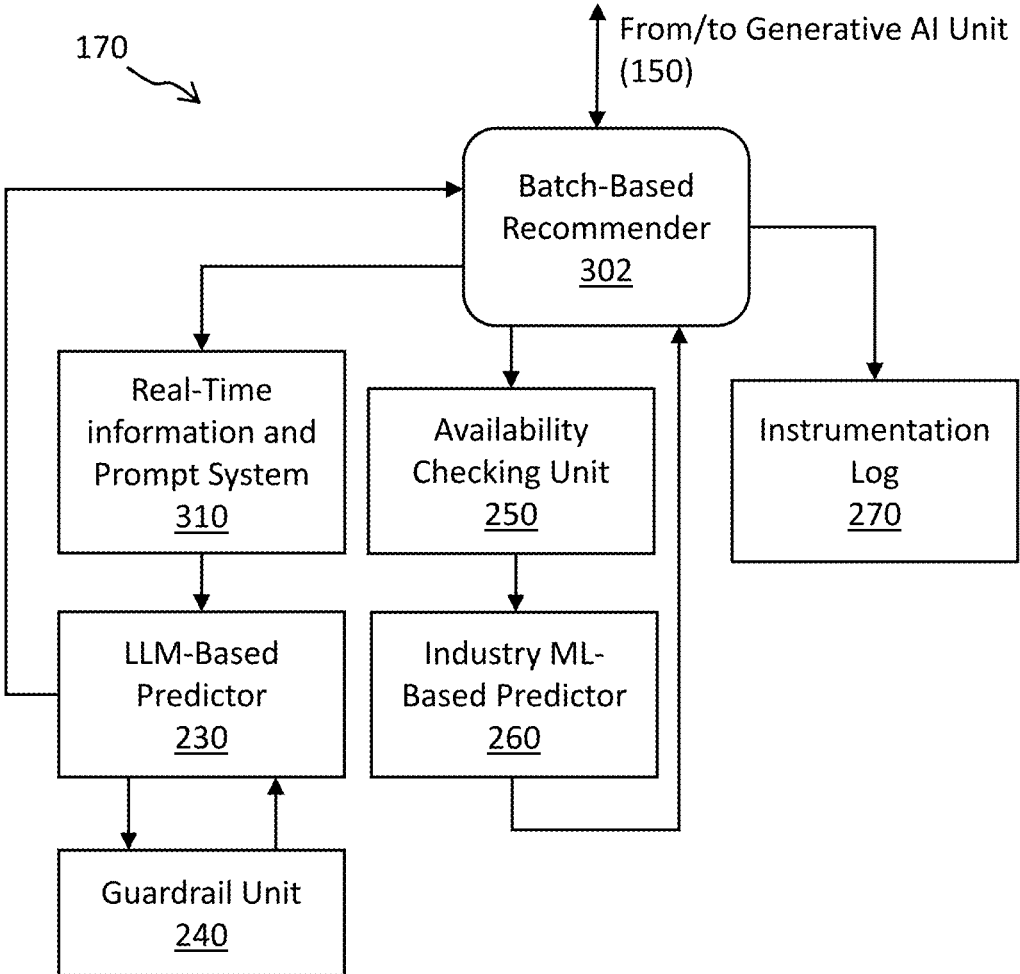
FIG. 3 is a block diagram illustrating a structure of an exemplary batch-based recommendation unit in the exemplary domain name recommendation system shown in FIG. 1.

FIG. 3 is a block diagram illustrating a structure of an exemplary batch-based recommendation unit 170 in the exemplary domain name recommendation system 100 shown in FIG. 1. The batch-based recommendation unit 170 may generate domain name recommendations in batches in response to customer queries. As shown in FIG. 3, the batch-based recommendation unit 170 may include a batch-based recommender 302 in communication with the generative AI unit 150. In at least some embodiments, the batch-based recommender 302 may provide received shopper_id and visitor_id to a real-time information and prompt system 310. Like the real-time information system 210 shown in FIG. 2, the real-time information and prompt system 310 retrieves customer signals and user profile based on the shopper_id and visitor_id, and construct prompts with the customer signals and user profile. The prompts may then be provided to the exemplary LLM-based predictor 230 which includes a trained AI model for generating domain name recommendations. Outputs from the LLM-base predictor 230 in the form of domain recommendation strings may be passed to the guardrail unit 240 for sanitization. The guardrail unit 240 exemplarily checks for taboo tokens, exclusion words and/or sellable TLDs in the domain name recommendations generated by the LLM-based predictor 230. Sanitized domain name recommendations may then be passed back to the LLM-based predictor 230 and further to the batch-based recommender 302. In at least some embodiments, the batch-based recommender 302 may provide the sanitized domain name recommendations to the availability checking unit 250 to obtain available domain name recommendations. The availability checking unit 250 provides the available domain name recommendations to the industry ML based predictor 260. the industry ML-based predictor 260 may provide industry information for each of the recommended domain name, and then output the enriched domain name recommendation to the batch-based recommender 302 for being accessed by the generative AI unit 150 via an API.

Referring again to FIG. 3, the batch-based recommendation unit 170 may also include an instrumentation log unit 270 for monitoring and analysis of the performance of the system 100.

Figure 4:
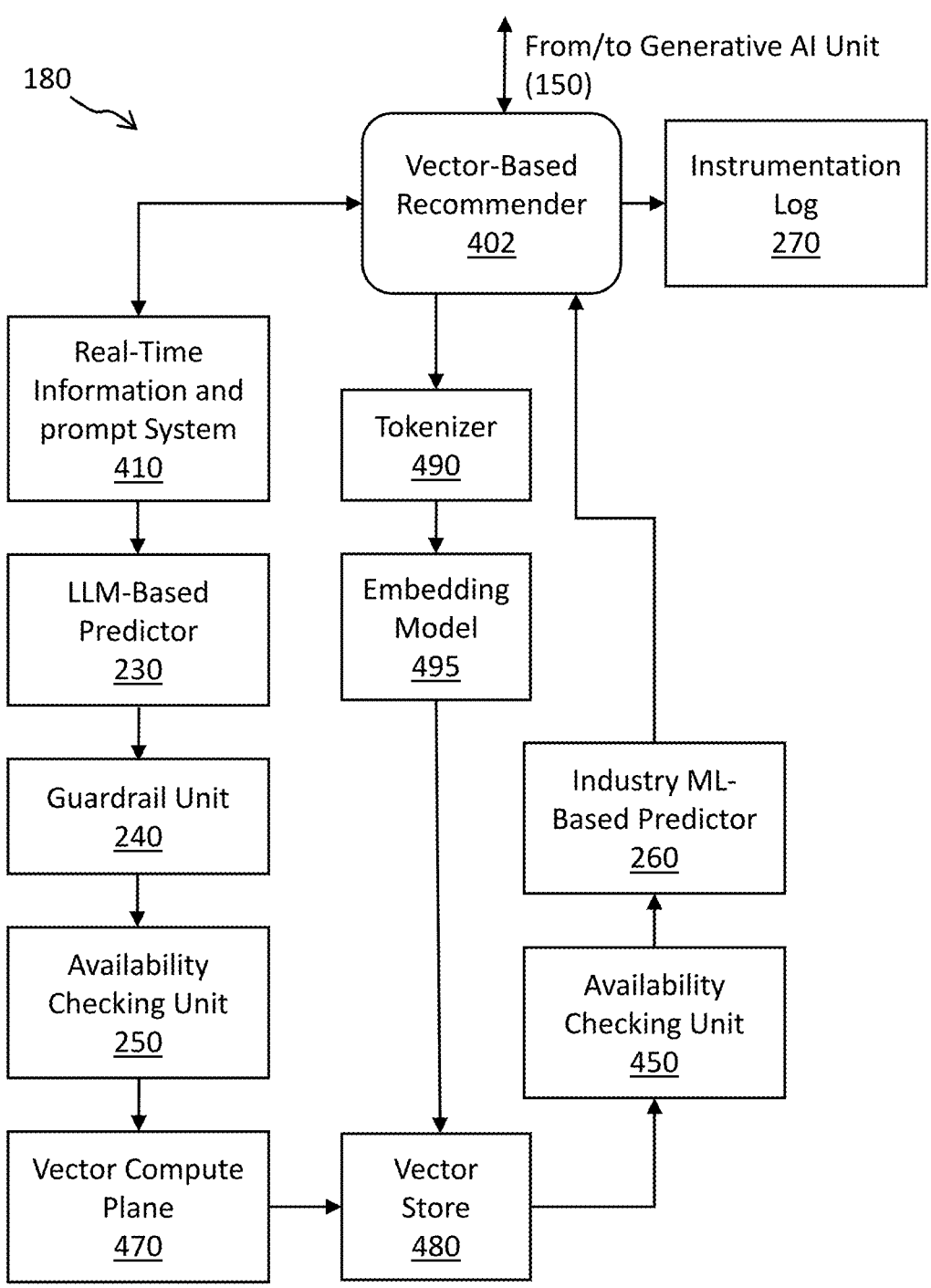
FIG. 4 is block diagram illustrating a structure of an exemplary vector database-based recommendation unit in the exemplary domain name recommendation system shown in FIG. 1.

FIG. 4 is block diagram illustrating a structure of an exemplary vector database-based recommendation unit 180 in the exemplary domain name recommendation system 100 shown in FIG. 1. The vector database-based recommendation unit 180 may generate domain name recommendations based on a vector and uses a vector cluster generated by a vector similarity search engine to pull the best matches based on cosine distance in response to customer queries for a swift domain name recommendation. In neural networks, vectors may be used to represent inputs, outputs, weights, and biases. The input data and learned parameters are often organized in vector form to facilitate efficient computation and training. In the context of vector data, clustering refers to the process of grouping similar vector together. The vector similarity search engine allows users to organize and analyze data by identifying natural groupings within the dataset.

As shown in FIG. 4, the vector database-based recommendation unit 180 exemplarily includes a vector-based recommender 402 in communication with the generative AI unit 150 via APIs. The vector-based recommender 402 passes the shopper_id, visitor_id and country_site information received from the generative AI unit 150 to the real-time information and prompt system 410. In at least some embodiments, the real-time information and prompt system 410 uses the shopper_id, visitor_id and country_site information to obtain customer signals and market signals, and generate prompts with the customer signals and market signals. In some embodiments, the market signal is obtained from context information associated with the shopper_id, visitor_id and country_site information.

Referring again to FIG. 4, the generated prompts may be provided to the LLM-based predictor 230 for generating domain name recommendations, which may then be sanitized by the guardrail unit 240. The sanitized domain name recommendations may be provided to the availability checking unit 250 to generate available domain name recommendations as inputs to a vector compute plane 470. The vector compute plane 470, which is described herein below in association with FIG. 6, may generate quantized vectors with payload from the available domain recommendations. The quantized vectors may be stored in a vector store 480.

Referring again to FIG. 4, the customer query received by the vector-based recommender 402, via APIs from the generative AI unit 150, may be provided to a tokenizer 490. The tokenizer 490 may processes the customer query by converting the customer query into tokens. In some embodiments, the tokens may represent smaller meaningful components of a domain name, such as words or subwords. These tokens may then be passed to an embedding model 495 to generate vectors embedded with exemplary TLDs for searching in the vector space and retrieving relevant domain suggestions. The tokenizing process allows the embedding model 495 to better understand the structure and meaning of the domain name by converting the domain name into a meaningful vector format. The vectors embedded with TLDs may then be passed to the vector store 480.

Referring again to FIG. 4, the vector store 480 may be cloud storage, where the vector data may be held in multiple instances each contains a portion of the vector database, which may contain approximately 400 million domain names. This distributed setup is managed for efficient handling and searching of large-scale vector data across multiple instances.

As shown in FIG. 4, the vector store 480 provides the domain name recommendations and vector match scores to an availability checking unit 450 to generate available domain name recommendations. The industry ML based predictor 260 then adds industry information to each available domain name recommendation, and provides the results to the vector-based recommender 402.

As shown in FIG. 4, the vector database-based recommendation unit 180 may be an exemplary process of providing personalized domain name suggestions based on vectorized query matching. The process may include tokenizing customer queries, generating vector embeddings from the tokenized customer queries and performing vector space searches on the vector embeddings. In at least some embodiments, vectorized query matching may involves representing queries as vectors in a high-dimensional space and then using mathematical techniques to measure similarity or relevance between the vectors. In some embodiments, the similarity may be measured by cosine similarity which measures the cosine of the angle between two vectors.

Figure 5:
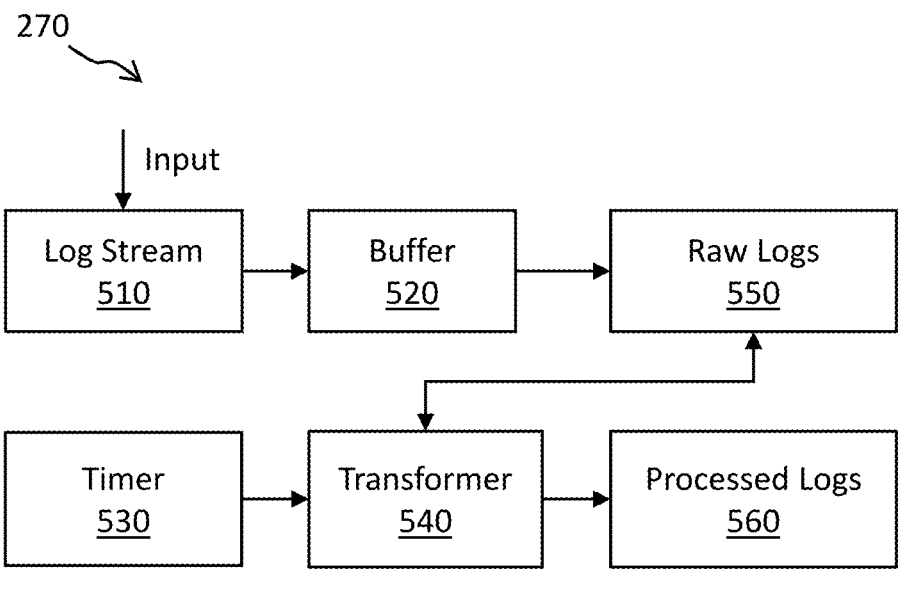
FIG. 5 is block diagram illustrating a structure of an exemplary instrumentation log unit shown in FIGS. 2-4.

FIG. 5 is block diagram illustrating a structure of an exemplary instrumentation log unit 270 shown in FIGS. 2-4. In some embodiments, the instrumentation log unit 270 may include a log stream unit 510, a buffer 520, a timer 430, a transformer 540, a raw logs unit 550 and a processed logs unit 560. The log stream unit 510 may receive each instance of an application such as the domain name recommendation, and group them together into a log group for easier management and analysis. In some embodiments, the instance may be a domain suggestion. The buffer 520 may temporarily store the log group before the log group may be delivered to the raw logs unit 550 for long term storage. The log group may be sent to the transformer 540 by the raw logs unit 550. At a predetermined time interval controlled by the timer 530, the transformer 540 may transform the log group, e.g., a JSON object of domain suggestions, to an exemplary columnar format, so that the transformed log group can be easily readable by a data analyzer. The transformed log group may be sent to the processed logs unit 560 for being later used for training data generation.

Figure 6:
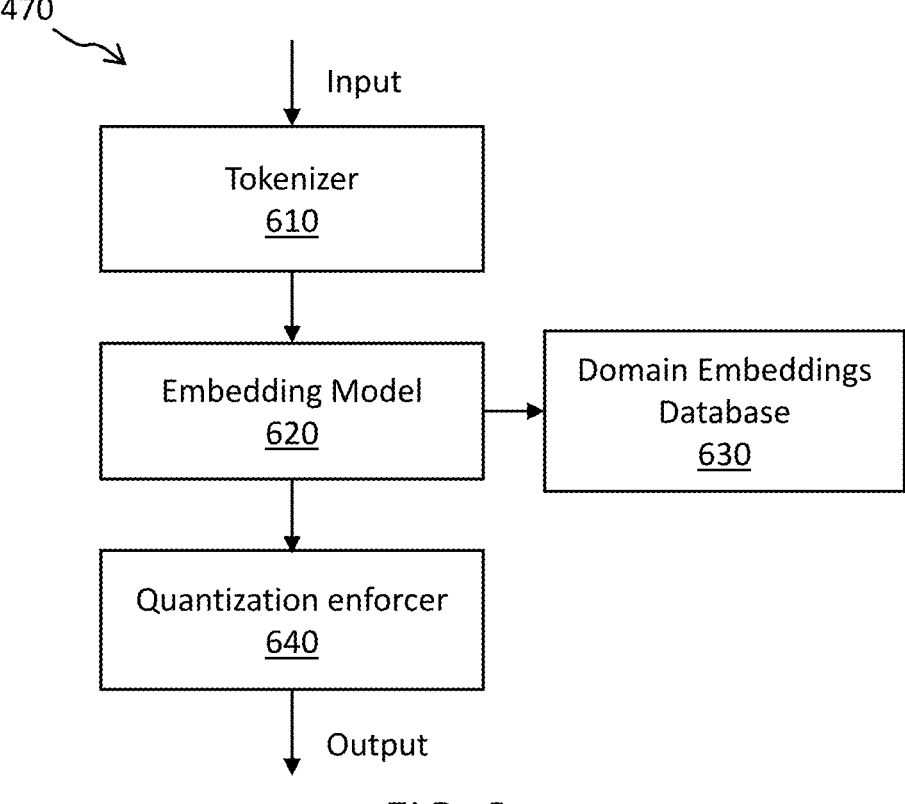
FIG. 6 is block diagram illustrating a structure of an exemplary vector compute plane unit in the exemplary vector database-based recommendation unit shown in FIG. 4.

FIG. 6 is block diagram illustrating a structure of an exemplary vector compute plane unit 470 in the exemplary database-based recommendation unit 180 shown in FIG. 4. In some embodiments, the vector compute plane 470 may include a tokenizer 610, an embedding model 620, a domain embeddings database 630 and a quantization enforcer 640. In some embodiments, the tokenizer 610 may receive recommended domain names and break down these domain names into smaller, meaningful components (tokens) such as words or subwords. This tokenizing process allows the embedding model to better understand the structure and meaning of the domain name by converting the domain name into a vector format. The tokenization is essential because it enables the system to perform efficient vector-based searches, such as cosine similarity, to find relevant and similar domain names in the vector database. In some embodiments, the embedding model 620 may be a compact, pre-trained machine learning model that transforms complex data such as domain names, into numerical representations called embeddings. The embedding model 620 may be designed to generate tokenized domain embeddings by converting tokenized English domain names into dense vector representations. These embeddings are then stored in the domain embeddings database 630, allowing for efficient similarity-based searches like cosine similarity. The embedding process helps in finding relevant and closely related domain names. The quantization enforcer 640 may be used to reduce the memory footprint of the vector data by converting higher-precision floating-point number into exemplary 8-bit integers. Such conversion may allow the embeddings to be stored more efficiently in the vector database, saving RAM space while maintaining acceptable search accuracy.

Figure 7:
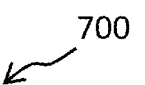
FIG. 7 is a block diagram illustrating an exemplary structure for training and inferencing an AI model for domain name recommendation in accordance with one or more embodiments of the present disclosure.

FIG. 7 is a block diagram illustrating an exemplary structure 700 for training and inferencing an AI model for domain name recommendation in accordance with one or more embodiments of the present disclosure. In some embodiments, the structure 700 may include a data source 710 for a training dataset generator 720. Both a base model 730 and a training dataset from the training dataset generator 720 may be provided to an estimator 740 for training the base model 730. The trained model may be fine-tuned to become a fine-tuned model 750 which will then be used by an inference unit 760. In some embodiments, the data source 710 may exemplarily include the real-time information system 210 to provide relevant, diverse, and high-quality data. As the real-time information system 210 improves the personalization and relevancy of the domain name recommendations generated by the domain name recommendation system 100, the real-time information system 210 may be essential to the overall effectiveness of the model's training process. In some embodiments, the data source 710 may also include a domain search mart 716 that holds historical domain searches done by customers. Data from the domain search mart 716 may also be used to generate training dataset.

In at least some embodiments, the data source 710 may include following exemplary data categories: search detail, suggestion level detail, search bill, visitor context, shopper portfolio, know your visitor (KYV), fact bill, past 7 day search behavior, past 180 day search behavior, market context, session context, domain portfolio.

In at least some embodiments, the training dataset generator 720 may collects raw data from the data source 710. The raw data may be in different formats, including text or numerical data. The training dataset generator 720 may clean and transform the raw data into a suitable format for training. This step may involve normalization, scaling, encoding categorical variables, and handling missing values. The training dataset generator 720 may create batches of data from the transformed data that may be fed into the machine learning model during training thereof. Dividing datasets into batches of data is particularly useful for handling large datasets that cannot fit into memory all at once. The training dataset generator 720 may annotate the data with correct labels.

Referring again to FIG. 7, the base model 730 may be a foundational model, which is a type of machine learning or deep learning model that is trained on extensive datasets to perform a wide range of tasks. An example of such foundation model may be Llama 7B which is a large language model (LLM) developed by Meta (formerly Facebook).

In at least some embodiments, the estimator 740 may be a tool or object that encapsulates the logic for training the base model 730. The estimator 740 may include methods for fitting the base model 730 to the training dataset, making predictions, and evaluating performance.

In at least some embodiments, fine tuning model 750 may involve training the pre-trained model on task-specific data, adjusting the model's parameters to better fit the new data while retaining the general knowledge it has already learned. The fine-tuned model 750 may then be deployed for inferencing.

Referring again to FIG. 7, the inference unit 760 may include an endpoint 762 and a predictor 765. In some embodiments, the endpoint 762 may be a stable and durable URL that user may use to request or invoke the deployed machine learning mode. The endpoint 762 may serve as an interface for making predictions with the deployed machine learning model. In some embodiments, the predictor 765 may utilize the deployed model to make predictions based on input data. According embodiment of the present disclosure, the deployed model may be the domain name recommendation model; the input may be a user's domain name request and associated customer signals, user profile and context information; and the predictions may be recommended domain names.

FIG. 8 is a flowchart illustrating an exemplary process 800 for generating domain name recommendation in accordance with one or more embodiments of the present disclosure. The process 800 may include exemplary blocks 810-860 as described hereinbelow.

In block 810, the domain name recommendation system may receive a domain search query form a customer client device of a user. The user exemplarily may enter the domain search query on the customer search interface 102 shown in FIG. 1.

In block 820, the domain name recommendation system may generate a prompt based in part on the domain search query to provide to a first machine learning model, the prompt instructing the first machine learning model to provide at least one domain name recommendation. In some embodiments, the first machine learning model may be contained in the LLM-based predictor 230 shown in FIGS. 2-4.

In block 830, the domain name recommendation system may filter the at least one domain name recommendation against a predetermined rule for excluding undesirable domain names if exist from the at least one domain name recommendation to form at least one sanitized domain name recommendation. In some embodiments, the filtering may be formed by the guardrail unit 240 shown in FIGS. 2-4. The predetermined rule may include a list of undesirable items for a domain name, such as taboo tokens, exclusion words and/or sellable TLDs.

In block 840, the domain name recommendation system may verify an availability to register at least one domain identified in the at least one sanitized domain name recommendation to form at least one available domain name recommendation. In some embodiments, the verification may be performed by the availability checking unit 250 shown in FIGS. 2-4.

In block 850, the domain name recommendation system may add industry information to the at least one available domain name recommendation to form at least one enriched domain name recommendation. The industry information may be exemplarily generated by a second machine learning model based at least in part on the domain search query. In some embodiments, the second machine learning model may be contained in the industry ML-based predictor 260 shown in FIGS. 2-4. In some embodiments, the second machine learning model may be trained by proprietary industry data collected by online service (including domain name registration) providers. The second machine learning model may be a deep learning model trained using SLD of a domain name and the industry mapping. The industry mapping in the context of domain names involves analyzing and understanding how different industries utilize domain names and the trends and patterns associated with their online presence.

In block 860, the domain name recommendation system may transmit the at least one enriched domain name recommendation to the customer client device.

Figure 9:
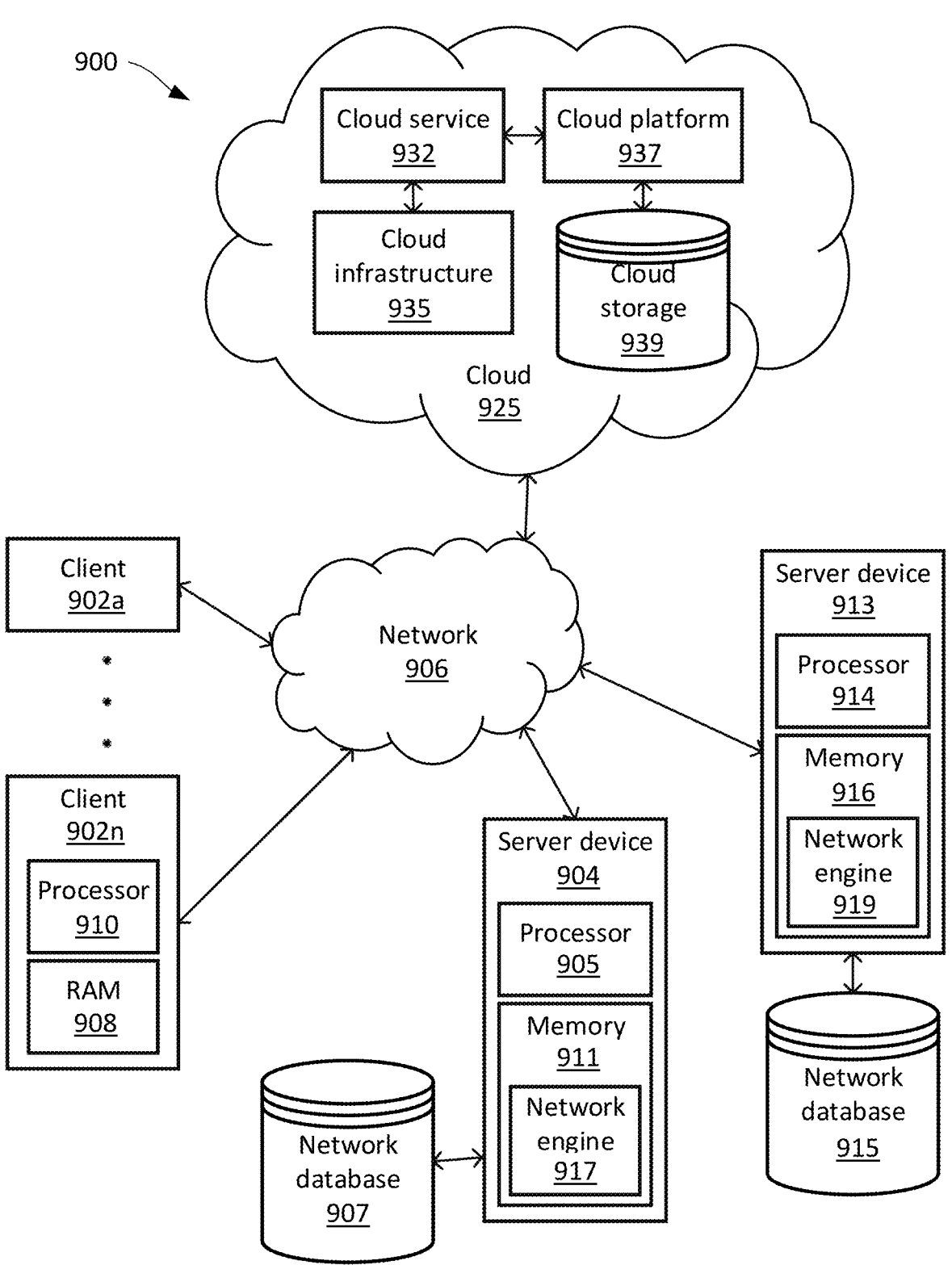
FIG. 9 is a block diagram illustrating an exemplary computer-based system/platform in accordance with one or more embodiments of the present disclosure.

FIG. 9 is a block diagram illustrating an exemplary computer-based system/platform 900 in accordance with one or more embodiments of the present disclosure. However, not all of these components may be required to practice one or more embodiments, and variations in the arrangement and type of the components may be made without departing from the spirit or scope of various embodiments of the present disclosure. In at least some embodiments, client computing devices 902a through 902n shown each at least includes a computer-readable medium, such as a random-access memory (RAM) 908 coupled to a processor 910 or FLASH memory (not shown) associated thereto. In at least some embodiments, processor 910 may execute computer-executable program instructions stored in memory 908. In at least some embodiments, processor 910 may include a microprocessor, an ASIC, and/or a state machine. In at least some embodiments, processor 910 may include, or may be in communication with, media, for example computer-readable media, which stores instructions that, when executed by processor 910, may cause processor 910 to perform one or more steps described herein. In at least some embodiments, examples of computer-readable media may include, but are not limited to, an electronic, optical, magnetic, or other storage or transmission device capable of providing a processor, such as the processor 910 of client 902a, with computer-readable instructions. In at least some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In at least some embodiments, the instructions may comprise code from any computer-programming language, including, for example, C, C++, Visual Basic, Java, Python, Perl, JavaScript, and etc.

In at least some embodiments, client computing devices 902a through 902n may also comprise a number of external or internal devices such as a mouse, a CD-ROM, DVD, a physical or virtual keyboard, a display, a speaker, or other input or output devices. In at least some embodiments, examples of client computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In at least some embodiments, client computing devices 902a through 902n may be specifically programmed with one or more application programs in accordance with one or more principles/methodologies detailed herein. In at least some embodiments, client computing devices 902a through 902n may operate on any operating system capable of supporting a browser or browser-enabled application, such as Microsoft™, Windows™, and/or Linux. In at least some embodiments, client computing devices 902a through 902n shown may include, for example, personal computers executing a browser application such as Microsoft Corporation's Internet Explorer™, Apple Computer, Inc.'s Safari™, Mozilla Firefox, and/or Opera. In at least some embodiments, through the client computing client devices 902a through 902n, users may communicate over exemplary network 906 with each other and/or with other systems and/or devices coupled to network 906.

As shown in FIG. 9, exemplary server devices 904 and 913 may be also coupled to network 506. Exemplary server device 904 may include a processor 905 coupled to a memory 911 that may store a network engine 917. Exemplary server device 913 may include a processor 914 coupled to a memory 916 that may store a network engine 919. In at least some embodiments, one or more client computing devices 902a through 902n may be mobile clients.

As shown in FIG. 9, exemplary server device 904 may be coupled to an exemplary network database 907; and exemplary server device 913 may be coupled to an exemplary network database 915. In at least some embodiments, exemplary databases 907 and 915 may be any type of database, including a database managed by a database management system (DBMS). In at least some embodiments, an exemplary DBMS-managed database may be specifically programmed as an engine that controls organization, storage, management, and/or retrieval of data in the respective database. In at least some embodiments, the exemplary DBMS-managed database may be specifically programmed to provide the ability to query, backup and replicate, enforce rules, provide security, compute, perform change and access logging, and/or automate optimization. In at least some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In at least some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In at least some embodiments, the exemplary DBMS-managed database may be specifically programmed to include metadata about the data that is stored.

As shown in FIG. 9, network 906 may be coupled to a cloud computing/architecture(s) 925. Cloud computing/architecture(s) 925 may include a cloud service 932 coupled to a cloud infrastructure 935 and a cloud platform 937, where the cloud platform 937 may be coupled to a cloud storage 939.

The computing system can also employ any number of software, firmware, and/or hardware configurations. For example, one or more of the example embodiments disclosed herein can be encoded as a computer program (also referred to as computer software, software applications, computer-readable instructions, and/or computer control logic) on a computer-readable medium.

The term "computer-readable medium," as used herein, can generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In at least some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In at least some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In at least some embodiments, as detailed herein, one or more exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In at least some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In at least some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTRO, SHA-1, SHA-2, Tiger (TTH), WHIRL-POOL, RNGs).

The aforementioned examples are, of course, illustrative and not restrictive.

As used herein, the term "user" shall have a meaning of at least one user. In at least some embodiments, the terms "user", "subscriber" "consumer" or "customer" should be understood to refer to a user of an application or applications for implementing the functions of the CVCP as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

In at least some embodiments, the exemplary inventive computer-based systems, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In at least some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In at least some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In at least some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In at least some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node may be activated. In at least some embodiments and, optionally, in combination of any embodiment described above or below, the exemplary aggregation function may be a mathematical function that combines (e.g., sum, product, etc.) input signals to the node. In at least some embodiments and, optionally, in combination of any embodiment described above or below, an output of the exemplary aggregation function may be used as input to the exemplary activation function. In at least some embodiments and, optionally, in combination of any embodiment described above or below, the bias may be a constant value or function that may be used by the aggregation function and/or the activation function to make the node more or less likely to be activated.

The aforementioned examples are, of course, illustrative and not restrictive.

At least some aspects of the present disclosure will now be described with reference to the following numbered clauses.

Clause 1. A method, including: receiving, by a computing device, a domain search query from a customer client device of a first user; generating, by the computing device, a prompt based in part on the domain search query to provide to a first machine learning model, the prompt instructing the first machine learning model to provide at least one domain name recommendation, where the first machine learning model is trained by utilizing at least one dataset including: first data reflecting interactions of a plurality of users with a plurality of domain portfolios; second data reflecting a plurality of domain-related actions performed by the plurality of users, including at least one first domain-related action with at least one top-level domain (TLD) and at least one second domain-related action with at least one second-level domain (SLD); third data reflecting a behavior of a second user during a current domain search session; fourth data reflecting a plurality of behaviors of the second user over a predetermined period of time covering a plurality of search sessions of the second user; and fifth data reflecting a plurality of search scenarios of the plurality of users; determining, by the computing device, the at least one domain name recommendation against at least one predetermined rule to form at least one sanitized domain name recommendation; verifying, by the computing device, an availability to register at least one domain identified in the at least one sanitized domain name recommendation to form at least one available domain name recommendation; adding, by the computing device, industry information to the at least one available domain name recommendation to form at least one enriched domain name recommendation, the industry information being generated by a second machine learning model based at least in part on the at least one available domain name recommendation; and transmitting, by the computing device, at least one computer instruction configured for the customer client device to present the at least one enriched domain name recommendation to the first user in association with an action-enable graphical user element.

Clause 2. The method of clause 1, where the prompt is generated based at least in part on at least one customer signal associated with the domain search query.

Clause 3. The method of clause 2, where the at least one customer signal is obtained through at least one cookie stored in the customer client device.

Clause 4. The method of clause 1, where the domain search query includes an identification of the customer client device.

Clause 5. The method of clause 4, where the prompt is generated based at least in part on at least one user profile.

Clause 6. The method of clause 5, where the at least one user profile is retrieved with the identification of the customer client device.

Clause 7. The method of clause 5, where the user profile information includes aggregated patterns of search behavior, purchase histories and preferences of the first user.

Clause 8. The method of clause 1, where the prompt includes at least one of: at least one prompt payload, at least one temperature hyperparameter and at least one diversity parameter.

Clause 9. The method of clause 1, where the predetermined rule includes a list of undesirable items for a domain name, the undesirable items including at least one of: at least one taboo token, at least one exclusion word and at least one unsellable TLD.

Clause 10. The method of clause 1, where the second machine learning model is trained by industry data collected by at least one online service provider.

Clause 11. The method of clause 1, where the industry information includes information on ways of utilizing the at least one sanitized domain name recommendation by at least one industry pertaining to the sanitized domain name recommendation.

Clause 12. The method of clause 1, further including streaming, by the computing device, at least the enriched domain name recommendation into at least one log group.

Clause 13. The method of clause 12, further including transforming the at least one log group from a first format to a second format.

Clause 14. The method of clause 1, further including: tokenizing, by the computing device, the domain search query; generating, by the computing device, a first plurality of vector embeddings from the tokenized domain search query; tokenizing, by the computing device, the available domain name recommendation; generating, by the computing device, a second plurality of vector embeddings from the tokenized available domain name recommendation; and performing, by the computing device, vector space search on the first and second plurality of vector embeddings.

Clause 15. The method of clause 1, further including augmenting the at least one enriched domain name recommendation with at least one keyword-based domain name suggestion to form at least one augmented domain name recommendation replacing the enriched domain name recommendation to be transmitted to the customer client device.

Clause 16. The method of clause 1, further including a public endpoint for receiving the domain search query and for providing the enriched domain name recommendation to the customer client device.

Clause 17. A system, including: at least one processor; and at least one memory storing a plurality of computing instructions configured to instruct the at least one processor to: receive a domain search query from a customer client device of a first user; generate a prompt based in part on the domain search query to provide to a first machine learning model, the prompt instructing the first machine learning model to provide at least one domain name recommendation, where the first machine learning model is trained by utilizing at least one dataset including: first data reflecting interactions of a plurality of users with a plurality of domain portfolios; second data reflecting a plurality of domain-related actions performed by the plurality of users, including at least one first domain-related action with at least one top-level domain (TLD) and at least one second domain-related action with at least one second-level domain (SLD); third data reflecting a behavior of a second user during a current domain search session; fourth data reflecting a plurality of behaviors of the second user over a predetermined period of time covering a plurality of search sessions of the second user; and fifth data reflecting a plurality of search scenarios of the plurality of users; determine the at least one domain name recommendation against a predetermined rule to form at least one sanitized domain name recommendation; verify an availability to register at least one domain identified in the at least one sanitized domain name recommendation to form at least one available domain name recommendation; add industry information to the at least one available domain name recommendation to form at least one enriched domain name recommendation, the industry information being generated by a second machine learning model based at least in part on the at least one available domain name recommendation; and transmit at least one computer instruction configured for the customer client device to present the at least one enriched domain name recommendation to the first user in association with an action-enable graphical user element.

Clause 18. The system of clause 17, where the prompt is generated based at least in part on at least one customer signal associated with the domain search query.

Clause 19. The system of clause 17, where the prompt is generated based at least in part on at least one user profile retrieved with an identification contained in the domain search query.

Clause 20. The system of clause 17, where the second machine learning model is trained by industry data collected by at least one online service provider.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method, comprising:

instructing, by a server computing device via an endpoint thereof, a client computing device of a first user to display a domain search interface;

receiving, via the endpoint of the server computing device, a domain search query from the domain search interface of the client computing device;

tokenizing, by the server computing device, the domain search query;

generating, by the server computing device, a first plurality of vector embeddings from the tokenized domain search query;

generating, by the server computing device, based on the domain search query and user profile information associated with the first user, a prompt comprising a temperature hyperparameter to provide to a first machine learning model, the prompt instructing the first machine learning model to provide at least one domain name recommendation, wherein the temperature hyperparameter controls predictability of the at least one domain name recommendation, in a case where the temperature hyperparameter is less than a threshold value, the at least one domain name recommendation is predictable, in a case where the temperature hyperparameter is greater than the threshold value, the at least one domain name recommendation is random, and the first machine learning model is trained by utilizing at least one dataset comprising:

first data reflecting interactions of a plurality of users, including the first user, with a plurality of domain portfolios, second data reflecting a plurality of domain-related actions, performed by the plurality of users, comprising at least one first domain-related action with at least one top-level domain (TLD) and at least one second domain-related action with at least one second-level domain (SLD), third data reflecting a behavior of a second user of the plurality of users, different from the first user, during a current domain search session, fourth data reflecting a plurality of behaviors, excluding the behavior, of the second user over a predetermined period of time covering a plurality of search sessions, excluding the current domain search session, of the second user, and fifth data reflecting a plurality of search scenarios of the plurality of users;

fine-tuning, in real-time, based on the prompt and one or more real-time interactions of the first user with the plurality of domain portfolios during the current domain search session, the first machine learning model to generate the at least one domain name recommendation, wherein the fine-tuning of the first machine learning model comprises:

optimizing the first machine learning model based on a Low-Rank Adaptation (LoRA) technique and the temperature hyperparameter, wherein the LoRA technique comprises modifying a subset of a plurality of internal parameters of the first machine learning model;

predicting the at least one domain name recommendation based on the optimized first machine learning model;

determining, by the server computing device, the predicted at least one domain name recommendation against at least one predetermined rule to form at least one sanitized domain name recommendation;

verifying, by the server computing device, an availability to register the at least one sanitized domain name recommendation to form at least one available domain name recommendation;

tokenizing, by the server computing device, the at least one available domain name recommendation;

generating, by the server computing device, a second plurality of vector embeddings from the tokenized at least one available domain name recommendation;

performing, by the server computing device, a vector space search on the first plurality of vector embeddings and the second plurality of vector embeddings to form at least one vector-based domain name recommendation;

adding, by the server computing device, industry information to the at least one vector-based domain name recommendation to form at least one enriched domain name recommendation, wherein the industry information is generated by a second machine learning model based at least in part on the at least one available domain name recommendation; and transmitting, by the server computing device via the endpoint, at least one computer instruction configured for the client computing device to present the at least one enriched domain name recommendation to the first user in association with an action-enable graphical user element.

2. The method of claim 1, wherein the prompt is generated based at least in part on at least one customer signal associated with the domain search query.

3. The method of claim 2, wherein the at least one customer signal is obtained through at least one cookie stored in the client computing device.

4. The method of claim 1, wherein the domain search query comprises an identification of the client computing device.

5. The method of claim 1, wherein the user profile information is retrieved based on an identification of the client computing device.

6. The method of claim 1, wherein the user profile information comprises aggregated patterns of search behavior, purchase histories, and preferences of the first user.

7. The method of claim 1, wherein the prompt is selected from the group consisting of: at least one prompt payload and at least one diversity parameter.

8. The method of claim 1, wherein the predetermined rule comprises a list of undesirable items for the predicted at least one domain name recommendation, and the undesirable items are selected from the group consisting of: at least one taboo token, at least one exclusion word, and at least one unsellable TLD.

9. The method of claim 1, wherein the second machine learning model is trained based on industry data collected by at least one online service provider.

10. The method of claim 1, wherein the industry information comprises information on ways of utilizing the at least one sanitized domain name recommendation by at least one industry pertaining to the at least one sanitized domain name recommendation.

11. The method of claim 1, further comprising streaming, by the server computing device, the at least one enriched domain name recommendation into at least one log group.

12. The method of claim 11, further comprising transforming the at least one log group from a first format to a second format.

13. The method of claim 1, further comprising:

augmenting the at least one enriched domain name recommendation with at least one keyword-based domain name suggestion to form at least one augmented domain name recommendation; and transmitting the at least one augmented domain name recommendation to the client computing device.

14. A system, comprising:

at least one processor; and at least one memory storing a plurality of computing instructions configured to instruct the at least one processor to:

instruct, via an endpoint of the system, a client computing device to display a domain search interface;

receive, via the endpoint, a domain search query from the domain search interface of the client computing device of a first user;

tokenize the domain search query;

generate a first plurality of vector embeddings from the tokenized domain search query;

generate, based on the domain search query and user profile information associated with the first user, a prompt comprising a temperature hyperparameter to provide to a first machine learning model, the prompt instructing the first machine learning model to provide at least one domain name recommendation, wherein the temperature hyperparameter controls predictability of the at least one domain name recommendation, in a case where the temperature hyperparameter is less than a threshold value, the at least one domain name recommendation is predictable, in a case where the temperature hyperparameter is greater than the threshold value, the at least one domain name recommendation is random, and the first machine learning model is trained by utilizing at least one dataset comprising:

first data reflecting interactions of a plurality of users, including the first user, with a plurality of domain portfolios, second data reflecting a plurality of domain-related actions performed by the plurality of users, comprising at least one first domain-related action with at least one top-level domain (TLD) and at least one second domain-related action with at least one second-level domain (SLD), third data reflecting a behavior of a second user of the plurality of users, different from the first user, during a current domain search session, fourth data reflecting a plurality of behaviors, excluding the behavior, of the second user over a predetermined period of time covering a plurality of search sessions, excluding the current domain search session, of the second user, and fifth data reflecting a plurality of search scenarios of the plurality of users;

fine-tune, in real-time, based on the prompt and one or more real-time interactions of the first user with the plurality of domain portfolios during the current domain search session, the first machine learning model to generate the at least one domain name recommendation, wherein the fine-tuning of the first machine learning model comprises:

optimize the first machine learning model based on a Low-Rank Adaptation (LoRA) technique and the temperature hyperparameter, wherein the LoRA technique modifies a smaller subset of a plurality of internal parameters of the first machine learning model;

predict the at least one domain name recommendation based on the optimized first machine learning model;

determine the predicted at least one domain name recommendation against a predetermined rule to form at least one sanitized domain name recommendation;

verify an availability to register the at least one sanitized domain name recommendation to form at least one available domain name recommendation;

tokenize the at least one available domain name recommendation;

generate a second plurality of vector embeddings from the tokenized at least one available domain name recommendation;

perform a vector space search on the first plurality of vector embeddings and the second plurality of vector embeddings to form at least one vector-based domain name recommendation;

add industry information to the at least one vector-based domain name recommendation to form at least one enriched domain name recommendation, wherein the industry information is generated by a second machine learning model based at least in part on the at least one available domain name recommendation; and transmit, via the endpoint, at least one computer instruction configured for the client computing device to present the at least one enriched domain name recommendation to the first user in association with an action-enable graphical user element.

15. The system of claim 14, wherein the prompt is generated based at least in part on at least one customer signal associated with the domain search query.

16. The system of claim 14, wherein the user profile information is retrieved based on an identification contained in the domain search query.

17. The system of claim 14, wherein the second machine learning model is trained based on industry data collected by at least one online service provider.

\* \* \* \* \*